Dec. 31, 1968  R. B. WALLACE  3,418,840
COMPASS COMPENSATION
Filed Aug. 2, 1965
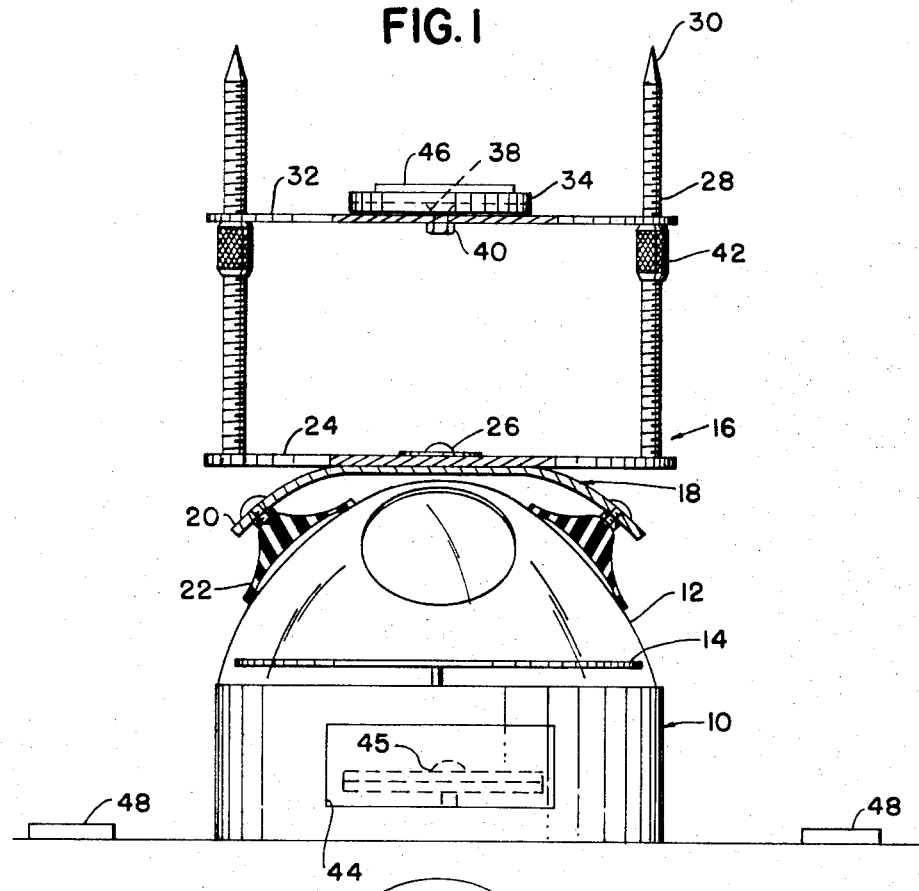
FIG. 1
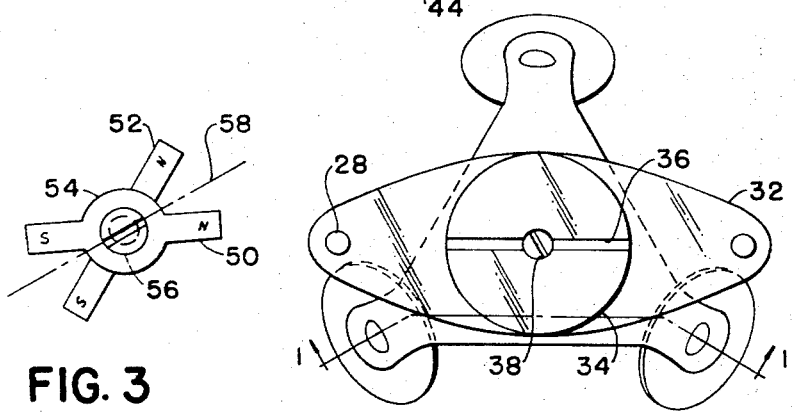
FIG. 3
FIG. 2
INVENTOR.
RICHARD B. WALLACE
BY
ATTORNEYS

United States Patent Office 3,418,840
Patented Dec. 31, 1968

---

3,418,840
COMPASS COMPENSATION
Richard B. Wallace, Bloomfield Hills, Mich., assignor to The Oakland Corporation, Troy, Mich., a corporation of Michigan
Filed Aug. 2, 1965, Ser. No. 476,343
4 Claims. (Cl. 73—1)

ABSTRACT OF THE DISCLOSURE

Method and apparatus for compensating a compass on a vehicle which comprises removing the compass from the vehicle to a point where it is subjected only to the earth's magnetic field, there neutralizing the earth's magnetic field by adjustment of first magnetic means, restoring the compass and adjusted magnetic means to the vehicle, thereafter adjusting second magnetic means permanently associated with the compass to neutralize the vehicle's magnetic field, and finally, removing the first magnetic means.

---

The present invention relates to compass compensation, and more particularly to a method and apparatus for eliminating compass error due to local magnetic disturbances.

In accordance with the present invention the orientation in space of a compass on a vehicle, such as a boat, aircraft, or the like is noted, the compass removed from the source of the local magnetic disturbances to an area where it is subjected only to the influence of the earth's magnetic field, and is there oriented as on the vehicle. At this time, and while it is subjected only to the earth's magnetic field, the magnetic field, or at least its horizontal component is effectively neutralized by the adjustment of suitable magnetic compensating means so that the compass needle or magnet is free to turn or to remain in any position. Thereafter, the compass is returned to the vehicle and mounted with its original orientation. At this time the compass magnet is therefore subjected solely to the disturbing magnetic influence of the vehicle. While the magnetic means which neutralizes the earth's magnetic field remains in its adjusted position second magnetic means are adjusted to neutralize the disturbing magnetic influence attributable to the vehicle. This is accomplished when the compass magnet or needle is again free to turn in any direction and to remain in any position to which it is adjusted.

Thereafter, the first magnetic means which neutralized the earth's magnetic field is removed, leaving the magnet subject only to a magnetic compensating means effective to neutralize the disturbing magnetic influence of the vehicle.

With the foregoing general statements in mind, it is an object of the present invention to provide a novel method of compensating the magnetic compass to eliminate any disturbing magnetic influence resulting from at least semipermanently magnetized structure adjacent the magnet in a vehicle or the like.

It is a further object of the present invention to provide a method as described in the preceding paragraph which comprises the step of first eliminating the effect of the earth's magnetic field and thereafter neutralizing the remaining magnetic field which is attributable to the disturbing magnetic influence of structure surrounding the magnet in a vehicle or the like.

It is a further object of the present invention to provide a method of compensating a magnetic compass against disturbing magnetic influences attributable to structure surrounding the compass at its point of use in a vehicle or the like, which comprises removing the compass to a location in which it is subjected solely to the earth's magnetic field, neutralizing at least the horizontal component of the earth's magnetic field, restoring the compass with the earth's magnetic field still neutralized to its location of use on the vehicle, thereafter neutralizing the horizontal component of the magnetic field attributable to structure on the vehicle, and finally, terminating neutralization of the earth's magnetic field, leaving the compass subject only to the influence of the earth's magnetic field.

It is a further object of the present invention to provide a method for compensating a magnetic compass on a vehicle or the like which comprises connecting a compensating and sighting device to the compass on the vehicle, sighting a distant object therewith to establish its orientation, removing the compass with the device attached thereto from the vehicle to an area in which it is subject solely to the earth's magnetic field, again sighting with the device to orient the compass in substantial alignment with its original orientation, adjusting magnetic means of the device to neutralize the horizontal component of the earth's magnetic field, restoring the compass and the device to the vehicle, sighting with the device to restore the compass to its original axis of orientation, adjusting a second magnetic compensating means to eliminate all remaining horizontally acting magnetic influence on the compass, thereby in effect neutralizing horizontal component of any disturbing magnetic influence attributable to structure on the vehicle, and finally removing the combined sighting and compensating device, leaving the compass compensated for disturbing magnetic influences attributable to structure on the vehicle and subject solely to the earth's magnetic field.

It is a further object of the present invention to provide a device for compass compensation comprising support structure for temporary connection to a compass, sighting means on the device, and adjustable compass compensating means on the device.

It is a further object of the present invention to provide a device as described in the preceding paragraph in which the support means comprises suction cups.

It is a further object of the present invention to provide a device as described in the two preceding paragraphs in which the compass compensating means comprises a magnet support rotatable about a vertical axis and is vertically adjustable.

Other objects and features of the invention will become apparent as the description proceeds, especially when taken in conjunction with the accompanying drawing, illustrating a preferred embodiment of the invention, wherein:

FIGURE 1 is an elevational view of a magnetic compass to which the combined sighting and compass compensating means is attached, partly in section on the line 1—1, FIGURE 2.

FIGURE 2 is a plan view of the sighting and compass compensating device removed from the compass.

FIGURE 3 is a diagrammatic plan view of a suitable built-in compass compensator.

The present invention is based upon the fact that a magnetic compass positioned on a vehicle such for example as a boat, aircraft, or the like, is subjected to a magnetic influence which may be resolved into two major components, the earth's field and the resultant of all other local permanent or semi-permanent disturbances which hereinafter will be referred to as the local field. If the earth's magnetic field could be "shut off" or neutralized temporarily, the compass would of course point solely in accordance with the orientation of the poles of the loical field. This local field could then be dealt with directly and with no confusing involvement with the earth's magnetic field. The compass would, in fact, be a precise indicator of the angle and polarity of the local field. In the present case, concern is only with horizontal components of magnetic fields, and the following description should be understood accordingly.

The first step therefore is to "shut off" the earth's magnetic field. Obviously, the presence of the local field would involve itself so that the first step is carried out by removing the magnet from the vehicle to a point as nearly as possible free from metallic objects. It is necessary to keep the same angular position or orientation of the compass which it will have when restored to the vehicle.

In order to accomplish this the compass which is illustrated as comprising a base 10, a transparent bowl or cover 12, and a rotatable magnetically influenced indicator 14, has temporarily attached thereto a combined orientation and compass compensating device indicated generally at 16. This device comprises a support 18 having inclined legs 20 each of which carries a suction cup 22. The support 18 may conveniently be a lead stamping so that the legs 20 are bendable to conform to different bowl shapes. Connected to the support 18 is an angularly adjustable plate 24 which is connected to the support 18 by a pivot mounting 26. As best seen in FIGURE 2, the plate 24 is elongated and adjacent its opposite ends it is provided with a pair of threaded posts 28 having pointed ends 30. Vertically adjustable on the posts 28 is an elongated platform 32 to the central portion of which is mounted a rotatable disc 34 having an elongated magnet receiving slot 36. The disc 34 is mounted for rotation by means of a countersunk screw 38 threaded into the platform 32 or extending through the platform and connected to a nut 40. The vertical spacing of the platform above the compass base 10 is adjusted by knurled nuts 42 threaded to the posts 28.

In the present case it is assumed that magnetic compensating means are provided in the base 10 of the compass to which access may be had through a door indicated at 44. Such adjustable magnetic means is indicated diagrammatically at 45. A suitable magnetic means will subsequently be described and it is sufficient to note at this time that the principal requirement is that it be adjustable about a vertical axis and that it also be adjustable as to its strength.

In order to carry out the present invention the rotatable plate 24 is adjusted about the vertical axis of the pivot 26 to align the points 30 of the posts 28 with some distant object. During this operation the vehicle will be retained against angular displacement. At this time the compass, with the device 16 firmly attached thereto, is removed from the vehicle and taken to a place where it is as nearly as possible subject only to the earth's magnetic field, and is then re-oriented into substantial alignment with the axis of orientation determined before its removal from the vehicle using the aiming points 30 for this purpose. In effecting this orientation it is desirable to maintain an accuracy of 1 degree and certainly not exceeding 2 degrees with reference to the original orientation of the compass. If the aiming point is not sufficiently remote, it will be necessary to make a correction for lateral displacement of the compass from the line of sight.

The rotatable magnetic element 14 of the compass will at this time align itself with the horizontal component of the earth's magnetic field uninfluenced by any local disturbance attributable to the local magnetic field of the vehicle. The disc 34 is not rotated so that the slot 36 is in alignment with the earth's magnetic field and a bar magnet 46 with its polarity reversed to the earth's magnetic field is positioned in the slot 36. The platform 32 is now raised or lowered as required to a position in which the bar magnet received in the slot 36 is effective substantially to neutralize the horizontal component of the earth's magnetic field. Care must be exercised to maintain the original orientation of the bar magnet 46 irrespective of any swinging of the rotatable magnetic element 14 of the compass. When the bar magnet 46 has moved into the position which neutralizes the horizontal component of the earth's magnetic field, the rotatable magnetic element 14 may be moved to any position, as for example by temporary application of a small magnet adjacent its edge portion, and when the small magnet it removed the magnetic element 14 will remain in whatever position to which it was moved.

Without disturbing the connection between the device 16, the adjustment of the platform 32 or adjustment of the disc 34, the compass is now restored to its operating position aboard the vehicle and is again oriented in its original position by aligning the points 30 with the distant object previously noted. Restoring the compass to the vehicle of course subjects it to the local field of the vehicle so that the compass needle or the rotatable magnetic element 14 will align itself with the local magnetic field.

At this time the compass is again compensated by appropriate adjustment of a second magnetic compensating means. The requirement for this additional magnetic compensating means is that it be adjustable about the vertical axis passing through the pivot axis of the rotatable compass element 14 and that it be adjustable as to strength. If the compass base is not provided with built-in compensating means fulfilling these requirements, the compensation may be by exterior magnets such as illustrated at 48, which may be positioned at opposite sides of the compass in alignment with the direction the compass points under the sole influence of the local magnetic field. If it happens that support surfaces for the magnets 48 are not available where the magnets should be placed it will be possible to produce an artificial distortion of the local magnetic field by positioning additional magnetic means so as to cause the resultant local magnetic field to swing the compass card to a position such that supports are available for the magnets 48. Obviously, the second magnetic compensating means comprising the magnets 48, is adjustable about the vertical axis of the compass base 10 simply by positioning both of the magnets in different angular positions with reference to the compass at diametrically opposite sides thereof.

However, it is preferable to provide the second magnetic compensating means as an integral part of the compass and thus to avoid the necessity of providing supports for compensating magnets exterior thereof. For this purpose magnetic means of the type illustrated in my prior application Ser. No. 386,873 (now abandoned) may be employed. For completeness however, this magnetic means is illustrated in FIGURE 3 and will be briefly described.

Two bar magnets 50 and 52 are provided each having a central enlargement, the enlargement on the magnets being indicated at 54. These magnets are rotatably mounted about a vertical pivot indicated at 56 which may take the form of a screw passing through aligned holes in the enlargement 54 of the bar magnets. With this arrangement the magnets may be adjusted relative to each other to provide a resultant magnetic field of variable strength. Thus, when the north poles of the magnets are in coincidence the magnetic means has a maximum strength. When the north pole of one magnet is coincident with the south pole of the other magnet the effectiveness of the magnetic means is reduced to zero. In the position illustrated the composite magnet has an effective north-south axis indicated at 58 and the strength or effectiveness of the opposite magnet has a value intermediate those resulting when the like poles are in coincidence or opposition.

By loosening the screw 56 the magnets 50 and 52 may be adjusted relative to each other to vary the strength of the field and may be adjusted together as a unit to vary the orientation of the field.

The foregoing diagrammatic description represents a construction which is diagrammatically indicated at 45 in FIGURE 1.

The final step is simply the removal of the device 16, leaving the compass fully and completely compensated for the horizontal component of the local field of the vehicle.

It will be observed that before neutralizing the local field of the vehicle, the rotatable magnetic element 14 of the compass provided an accurate indication of the orientation of this field without any necessity for attempting to analyze vectors in a resultant field.

Not only does the rotatable magnetic element 14 of the compass provide an accurate indication of the orientation of the local field while still subjected to the first magnetic compensating means, but also the sensitivity to the magnetic field is greatly increased. A local magnetic disturbance which would be substantially undetectable by means of a compass subject to the local magnetic field produces a clear cut indication with the present construction.

The present method and apparatus enables quick accurate and easy compass compensation. Moreover, the accuracy of the compensation is especially great, a fact undoubtedly attributable to the sequential steps of neutralizing the earth's magnetic field by a first magnetic compensating device and thereafter neutralizing the remaining magnetic field or the local magnetic field by a second magnetic compensating device, and finally removing the first magnetic compensating device to leave the compass fully compensated for the disturbing influence of the local field.

It will be understood that the requirement of subjecting the compass solely to the earth's magnetic field during the initial compensation by device 16 may be satisfied by adjusting the magnetic means 45 to zero effectiveness, or providing the means 45 in a binnacle or compass support rather than in the compass proper.

The drawing and the foregoing specification constitute a description of the improved compass compensation in such full, clear, concise and exact terms as to enable any person skilled in the art to practice the invention, the scope of which is indicated by the appended claims.

What I claim as my invention is:

1. Apparatus for compensating a magnetic compass having a rotatable magnetic element, comprising an orienting and a first compensating device having means for detachably connecting it to a magnetic compass, said device including sighting means rotatable about a vertical axis and having sighting elements thereon adapted to be brought into alignment with a distant object by rotation thereof about such vertical axis, said device including a magnet support, first magnetic means on said support, and means for adjusting said magnet support about a vertical axis to position the poles of the magnetic means in opposition to the earth's magnetic field and to vary the effectiveness of said magnetic means on the rotatable magnetic element of the compass, and second compensating device independent of said first device including magnetic means adjustable to vary the direction and strength of its magnetic field in the area occupied by the rotatable magnetic element of the compass, said sighting means comprising vertical threaded posts having pointed tips, a plate rotatable about a vertical axis on which said posts are secured, a platform having openings through which said posts extend and nuts on said posts below said platform for effecting vertical adjustment of said platform.

2. The method of detecting and determining the direction of a local magnetic field on a vehicle which comprises maintaining the vehicle in a single oriented position, observing the orientation of the compass on the vehicle, removing the compass from the vehicle to an area in which it is completely outside the influence of the local magnetic field of the vehicle, orienting the compass into substantial alignment with its original position on the vehicle, neutralizing the horizontal component of the earth's magnetic field by adjusting first magnetic means in direct opposition to the earth's magnetic field relative to the compass, restoring the compass together with the first magnetic means to the vehicle, re-orienting the compass into its original position and noting the location of the rotatable magnetic element of the compass as an indication of the direction of the local magnetic field exclusive of any effect of the earth's magnetic field.

3. Apparatus as defined in claim 1 which comprises a rotatable support on said platform and magnetic means on said support.

4. Apparatus including first magnetic compensating means for compensating a magnetic compass having a rotatable magnetic element and having second magnetic compensating means permanently associated with the compass and independent of said first magnetic compensating means, said apparatus comprising a connector for detachable connection to the compass, a sighting device carried by said connector for angular adjustment about a vertical axis and including sighting means for alignment upon rotation thereof with a distant object, said first magnetic means being adjustable to vary the orientation of the north-south axis of its magnetic field and to vary the strength of its magnetic field in the zone occupied by the rotatable magnetic device of the compass, said sighting means comprising a plate carried by said connector for angular adjustment about a vertical axis, and a pair of threaded posts carried by said plate, said first magnetic means comprising a platform having openings receiving said posts and being vertically adjustable therein, nuts on said posts for effecting adjustment of said platform, and magnetic means carried by said platform for angular adjustment about a vertical axis passing through the pivot axis of the rotatable magnetic element of the compass.

References Cited

UNITED STATES PATENTS

| 22,125 | 11/1858 | Kline | 33—225 |
|---|---|---|---|
| 2,507,933 | 5/1960 | Rasmussen | 73—1 |

FOREIGN PATENTS

| 598,751 | 2/1948 | Great Britain. |
|---|---|---|
| 934,900 | 1/1948 | France. |

S. CLEMENT SWISHER, *Acting Primary Examiner.*